United States Patent [19]

Pollak et al.

[11] Patent Number: 4,664,165

[45] Date of Patent: May 12, 1987

[54] SURFACE MOUNTED POWER TOOL

[75] Inventors: Henry M. Pollak; John W. Mauger, both of Pottstown, Pa.

[73] Assignee: American Machine and Tool Company, Inc., Royersford, Pa.

[21] Appl. No.: 826,632

[22] Filed: Feb. 6, 1986

[51] Int. Cl.[4] .............................................. B27C 1/00
[52] U.S. Cl. ................................. 144/117 R; 30/516; 51/266; 83/99; 83/169; 144/218; 241/55
[58] Field of Search ............... 83/98, 99, 169; 30/502, 30/516; 51/266; 241/55; 144/117 R, 117 A, 117 B, 114 R, 230, 231, 218

[56] References Cited

U.S. PATENT DOCUMENTS

| 1,190,372 | 7/1916 | Brown | 83/169 |
|---|---|---|---|
| 2,236,232 | 3/1941 | Brescka et al. | 183/37 |
| 2,371,681 | 3/1945 | Durdin, Jr. | 103/111 |
| 2,595,483 | 5/1952 | Petter | 144/117 R |
| 2,735,469 | 2/1956 | West | 241/55 |
| 2,774,399 | 12/1956 | Emmons | 145/4 |
| 2,919,734 | 1/1960 | Turner | 83/169 |
| 3,404,714 | 10/1968 | Runkle et al. | 144/117 |
| 3,876,159 | 4/1975 | Kidd | 241/55 |
| 4,009,837 | 3/1977 | Schnyder | 144/230 |
| 4,427,042 | 1/1984 | Mitchell et al. | 144/1 R |
| 4,592,514 | 6/1986 | John et al. | 241/55 |

OTHER PUBLICATIONS

Sears Catalog Advertisements Craftsman Tool, Owners Manual, "Motorized Jointer-Planer"

Primary Examiner—W. D. Bray
Attorney, Agent, or Firm—Seidel, Gonda, Goldhammer & Abbott

[57] ABSTRACT

A power tool provided with a rotating blade wheel having skewed axial vanes which follow the cutting blades during rotation to create an air flow which is parallel to the axis of rotation. A shroud adjacent to the blade wheel which deflects the debris created by the cutting blade away from the radial movement of the blade wheel. The debris is exhausted through the side of the power tool housing such that the power tool may be mounted directly onto a continuous flat or level surface of a work bench.

11 Claims, 4 Drawing Figures

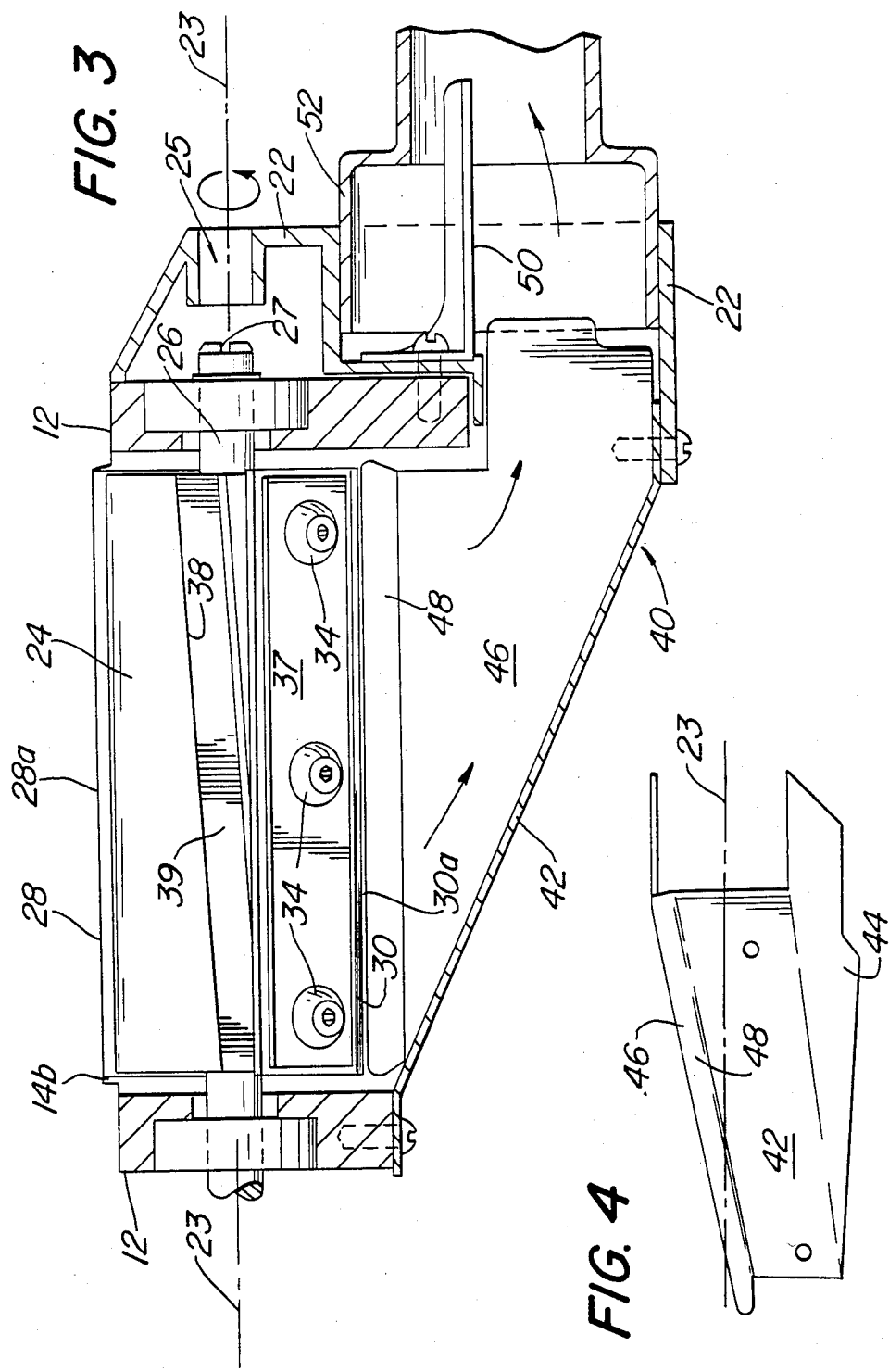

SURFACE MOUNTED POWER TOOL

BRIEF SUMMARY OF THE INVENTION

This invention relates to an improvement on a power tool, such as a jointer or planer, which is to be mounted directly onto a level or flat continuous work surface. Particularly, this invention relates to a means to create an exhaust or discharge flow of chips, sawdust, or other debris which are created by the cutting action of the blade wheel in the power tool. The discharge of the debris from the housing of the surface mounted power tool of the invention is through the side of the housing.

BACKGROUND OF THE INVENTION

Known power tools are typically mounted on a separate stand or set of legs. An opening is provided in the stand to permit the chips, sawdust or other debris created by the cutting action of the blade wheel of the typical power tool to be exhausted through the underside or bottom surface of power tool housing. This type structure utilizes gravitational forces to effectuate the discharge of the debris (U.S. Pat. No. 4,427,042). It is also known to provide a hand held power tool which deflects the debris away from the work surface area prior to exhaustion (U.S. Pat. No. 2,774,399). Another form of chip and debris exhaustion involves a fan or impeller structure which is attached to the shaft of the electric motor of the power tool creating an air flow through the cutting area (U.S. Pat. No. 2,236,323). This fan or impeller type structure is undesirable since it reduces the cooling effect of the fan on the electric motor of the power tool.

SUMMARY OF THE INVENTION

The power tool contemplated by the present invention generally comprises a housing having an electric motor adapted to rotate a drive shaft of a blade wheel. The upper surface of the power tool housing is divided into two sections formed on opposite sides of the rotating blade wheel. The upper surface of the housing can be raised or lowered with respect to the blade wheel such that a work piece of wood or other material which is passed over the cutting area is contacted by the blade wheel. A layer or portion of material is removed from the work piece by a continuous cutting action of the rotating blade wheel.

The invention further comprises a rotating blade wheel having, detachable blades which extend from a position on the periphery of the wheel. The blade wheel includes a plurality of vanes, each following a corresponding cutting blade during rotation of the wheel and which are skewed with respect to the axis of rotation of the blade wheel. An air current is created by the rotation of the blade wheel during its cutting motion which is substantially perpendicular to the plane of rotation and parallel to the rotational or longitudinal axis of the blade wheel. A channel may be provided in conjunction with each vane to increase the flow of air created by the rotating blade wheel.

A chamber is provided within the housing of the power tool which substantially surrounds the blade wheel. The chamber is further defined by a shroud. The shroud includes a peeler blade and a diagonal deflection surface, defining a channel for further directing the debris exhaust flow, produced by cutting action of the blade wheel, towards the side of the housing. The peeler blade prevents continued radial motion of the debris along with the blade wheel while the diagonal surface assists in directing the parallel flow of air and debris towards the exhaust opening on the side of the housing.

By providing a rotating blade wheel which produces a flow of air substantially parallel to its axis of rotation, the chips, sawdust and other debris may be directed through the side of the power tool housing. A side exhaust on the power tool permits the mounting of the tool on a continuous flat surface such as a workbench rather than a separately provided stand.

Further advantages will become apparent by particularly pointing out and describing the preferred embodiment of the invention as shown in the drawings.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 3 shows a partial cross section view of the invention as position in the housing of the power tool shown in FIG. 1.

FIG. 4 shows a top view of the shroud portion of the invention.

DETAILED DESCRIPTION OF THE DRAWINGS

Figure 1:
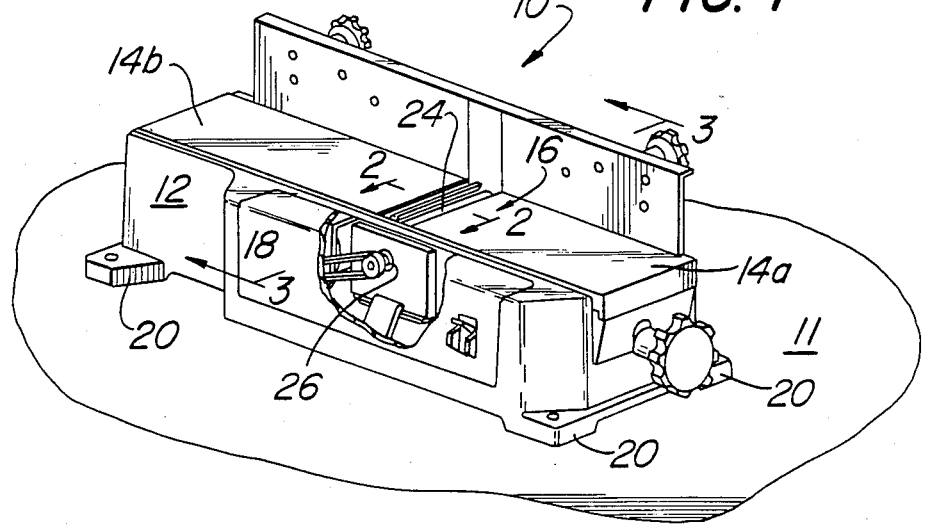
FIG. 1 shows a perspective view of a power tool for use with the contemplated invention.
Figure 2:
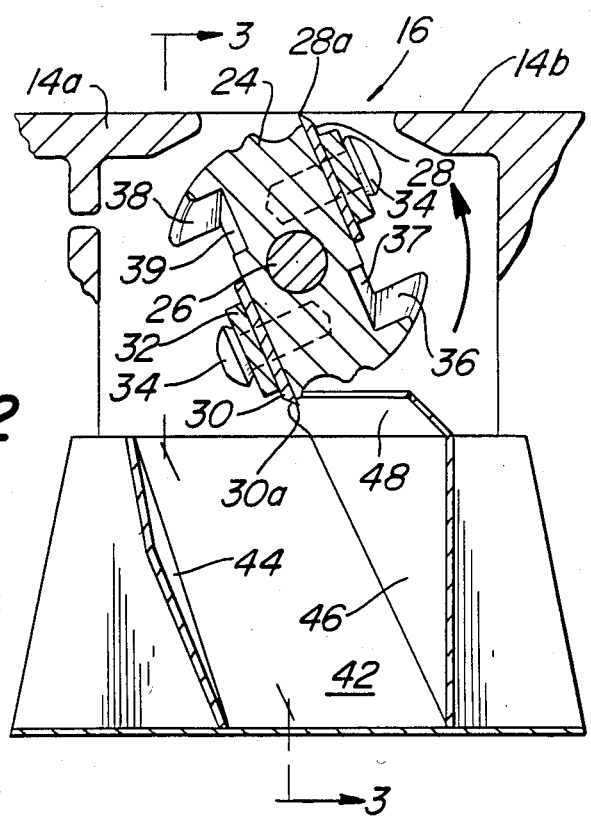
FIG. 2 shows a side cross sectional view of the invention.

In FIG. 1 is shown a power tool as generally contemplated by this invention. This power tool is typically a jointer/planer and is referred to in the drawings by the referenced numeral 10. The power tool 10 generally consists of a housing 12 having a upper surface 14 defining two opposite portions 14a and 14b. The upper surface portions 14a, 14b of the housing 12 are separated by a slot 16 which exposes a rotating blade wheel 24 mounted within the housing. Also, mounted within the housing 12 is an electric motor 18. The shaft of the electric motor 18 connects to a drive shaft 26 (FIGS. 2 and 3) which is journaled for rotation within the housing 12. The drive shaft 26 is provided with a slot 27 for engagement by a typical screw driver such that rotation of the blade wheel 24 may be induced without the operation of the electric motor 18. An exhaust port housing 22 (FIG. 3) is mounted onto the power tool housing 12 and is provided with an access opening 25 such that the rotating shaft 26 is not exposed but the slot 27 is accessible.

The power tool 10 is preferably to be mounted directly onto a continuous level or flat work surface 11 such as a workbench. Mounting tabs 20 are provided at each corner of the housing 12 for attachment of the housing 12 to the work bench by means of screws or bolts. The housing 12 is provided with an exhaust port 22 which communicates with a chamber within the housing 12. The exhaust port 22 is provided on a vertical or side surface of the housing 12 since the power tool 10 is to be mounted directly onto the continuous horizontal surface of the workbench.

A rotating blade wheel 24 is supported on the drive shaft 26 and positioned within the chamber of the housing 12. The drive shaft 26 is rotated about its central longitudinal axis 23 by the electric motor 18 through any convenient method, such as a pulley and belt combination. The blade wheel 24 is typically provided with two or more cutting blades 28 and 30. Each cutting blade 28, 30 is removably attached onto the blade wheel 24 by a corresponding support bar 32 and lock screws 34 such that the respective blades edge 28a, 30a define an extension above the rotational periphery of the blade wheel 24. The cutting blades 28, 30 are parallel with respect to the longitudinal axis 23 of the blade wheel 24. Trailing each of the cutting blades 28, 30 during rotation of the blade wheel 24 are vanes 36 and 38, respectively. The vanes 36, 38 are skewed with respect to the longitudinal axis 23 of the blade wheel 24. Furthermore, channels 37 and 39, may be provided adjacent to the engaging surface of the blade wheel 24 in contact with the cutting blades 28, 30. The vanes and channels are preferably, skewed at substantially the same angle with respect to the axis of rotation. These structures, which follow the cutting blades 28, 30 during the rotation of the blade wheel 24, create a flow of air which is substantially parallel to the axis of rotation.

The blade wheel 24 is mounted within the housing 12 such that the cutting blade edges 28a, 30a are exposed through slot 16 and project above the upper surface portion 14a of the housing 12. A work piece (not shown) is passed over this upper surface 14 and is brought into contact with the cutting blades 28, 30 on the rotating blade wheel 24. A layer of material is removed from the contacting surface of the work piece in a continuous manner by the blade ends 28a, 30a. The work piece is then supported after material removal on the upper surface portion 14b of housing 12. During removal of this material chips, dust or other debris is created by the cutting action of the blades 28, 30 on the work piece. The the blade wheel 24 during the rotating cutting action creates an air flow substantially parallel to the axis of rotation 23, such that this debris is directed away from the periphery of rotating blade wheel 24. The amount of air flow created by the blade wheel 24 is affected by the size of the opening 16 in the upper housing surface 14. Air is drawn into the opening by the rotation of the blade wheel 24 and its corresponding structure.

Surrounding the blade wheel 24 is a chamber which insulates the remainder of the power tool 10 from the debris created by the cutting action of the blades 28, 30. An exhaust port 22 provides an outlet for the debirs from the chamber to the exterior of the power tool housing 12. The chamber is further defined by a shroud 40 which aides in directing the chips and debris through the exhaust port 22. The shroud 40 includes deflection surface 42 which is angled diagonally with respect to the axis of rotation. The diagonal surface 42 slopes downwardly from a position adjacent to the periphery of the rotating blade wheel towards the exhaust port 22. Two oppositely positioned sidewalls 44 and 46 define the remainder of the shroud 40. Sidewall 46, which is located at the far end of the shroud 40 in the direction of rotation of the blade wheel 24, is provided with a peeler blade 48 to deflect the chips and debris which continue to move radially during rotation of the blade wheel 24 and the cutting blades 28, 30. The peeler blade 48 deflects this debris into the air flow created by the blade wheel 24 and through the chamber and which moves it towards the exhaust port 22. Side wall 44 may also be provided with inclined surface which directs the air and debris flow toward the sidewall 46 and assist in directing the debris toward exhaust port 22.

The area defined by the shroud 40 and the deflecting surface 42, side walls 44, 46 and peeler blade 48 affects the control of the air flow towards the exhaust port 22. The side wall 46 is, preferably, positioned vertically within the chamber, being substantially perpendicular to the upper housing surface 14. Side walls 44 and 46 are generally skewed with respect to the longitudinal axis of the blade wheel with each, preferably, at an angle of 15° from the axis 23 of the drive shaft 26. The side walls 44, 46 may also be positioned in a non-parallel relationship such that the shroud 40 diverges slightly. An off-set of side wall 44 of up to 5° from the peeler blade toward the exhaust port end 22 is preferred. The peeler blade 48 is positioned such that the blades edges 28a and 30a are rotated with minimal clearance adjacent to that most forward edge of the peeler blade 48. Side wall 44 is generally positioned to close the lower portion of the chamber from debris such that a channel is created for the air flow which enters through opening 16, is accelerated adjacent to blade wheel 24, is directed through the shroud 40 and is exhausted through port 22 with the cutter debris.

The exhaust port 22 may be provided with a deflection means 50 such that the chips and debris exhausted through the port 22 do not deflect up towards the operator of the power tool 10. The exhaust port 22 may also be adapted for use with a vacuum suction such that the chips and dust are not sent into the environment of the work area and, thus, the operator is not exposed to airborne dust and debris. A vacuum hose (not shown) may be connected directly to the exhaust port 22 or an adaptor 52, as shown in FIG. 3. The adaptor 52 is provided to permit connection between the exhaust port 22 and various sizes of vacuum hose.

The present invention may be embodied in other specific forms without departing from the spirit or essential attributes thereof and, accordingly, reference should be made to the appended claims, rather than to the foregoing specification, as indicating the scope of the invention.

We claim:

1. A motor driven power tool comprising: a housing having an interior chamber; a drive shaft connected to the motor for rotation thereof; and means defining a blade wheel, said means connected for rotation with said drive shaft and having removable cutting blades which extend from the periphery of the blade wheel for creating a continuous cutting action, and means for creating an air flow substantially parallel to the axis of rotation of the blade wheel provided on said blade wheel.

2. A power tool as claimed in claim 1 wherein said blade wheel means further comprises a cutting blade mounting surface for each said cutting blade, said cutting blades being removably attached to said blade wheel at said cutting blade mounting surface.

3. A power tool as claimed in claim 2 wherein said cutting blade attachment is provided by a support bar and a plurality of lock screws, said cutting blade and said support bar provided with a plurality of holes for receiving said lock screws, said screws engaging the interior said blade wheel on an said cutting blade support surface such that said support bar overlaps said cutting blade during attachment to said blade wheel.

4. A power tool as claimed in claim 1 wherein said air flow means further comprises vanes on said blade wheel, each said vane following a corresponding cutting blade during rotation of said blade wheel, said vanes being skewed axially with respect to the axis of rotation of said blade wheel.

5. A power tool as claimed in claim 4 wherein said air flow means further comprises channels provided on said blade wheel, said channels positioned adjacent to a corresponding vane, said channels skewed similar to said vanes.

6. A power tool as claimed in claim 1 further comprising a shroud within said interior chamber of said housing, said shroud communicating with the periphery of said blade wheel during rotation and defining a flow path for the parallel air flow from said air flow means of said blade wheel.

7. A power tool as claimed in claim 6 wherein said shroud comprises a bottom surface which is angled with respect to said axis of rotation, said surface sloping towards the direction of the air flow.

8. A power tool as claimed in claim 6 wherein said shroud communicates with an exhaust port on said housing such that said air flow is exhausted out a vertical side of said housing.

9. A power tool as claimed in claim 6 wherein said shroud further comprises a peeler blade which is positioned adjacent to said periphery of the rotating blade wheel, said peeler blade deflecting axially moving particles into said parallel air flow.

10. A power tool as claimed in claim 1 wherein said drive shaft is provided with engagement means for adjusting the rotational positioning of the blade wheel means within the housing.

11. A blade wheel to provide a continuous cutting action, said blade wheel comprising: a body portion provided for rotation about a central longitudinal axis; cutting blades attached to said body portion projecting beyond the rotational periphery of said body portion; vanes formed on said body portion, said vanes trailing said blades during rotation of said body portion, said vanes skewed with respect to said central longitudinal axis of said body portion such that an air flow is created substantially parallel to said axis line during rotation of said body portion.

* * * * *